March 17, 1970     P. C. TREXLER     3,501,213
ISOLATOR ASSEMBLY AND METHOD OF ENTERING SAME
Filed May 19, 1967     4 Sheets-Sheet 2
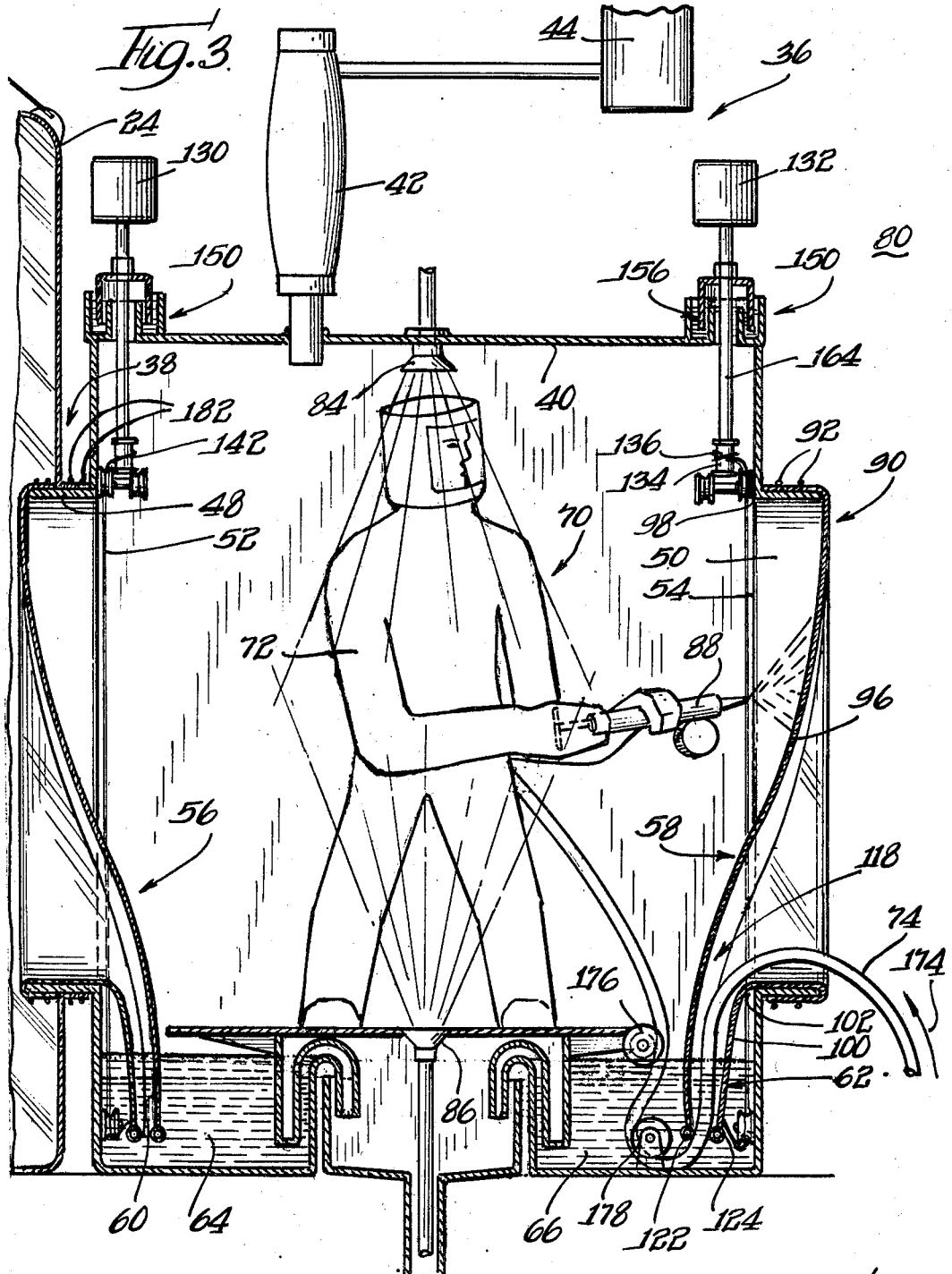
Inventor
Philip C. Trexler
By: Olson, Trexler, Wolters & Bushnell
attys

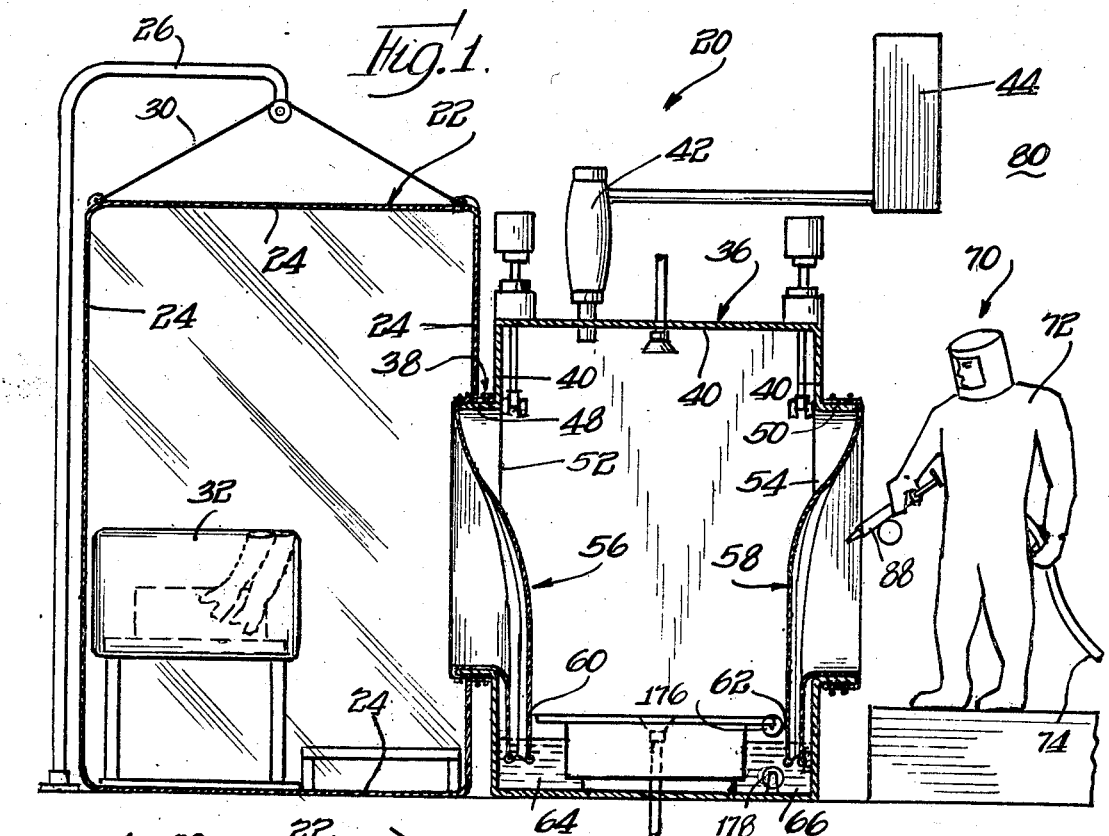
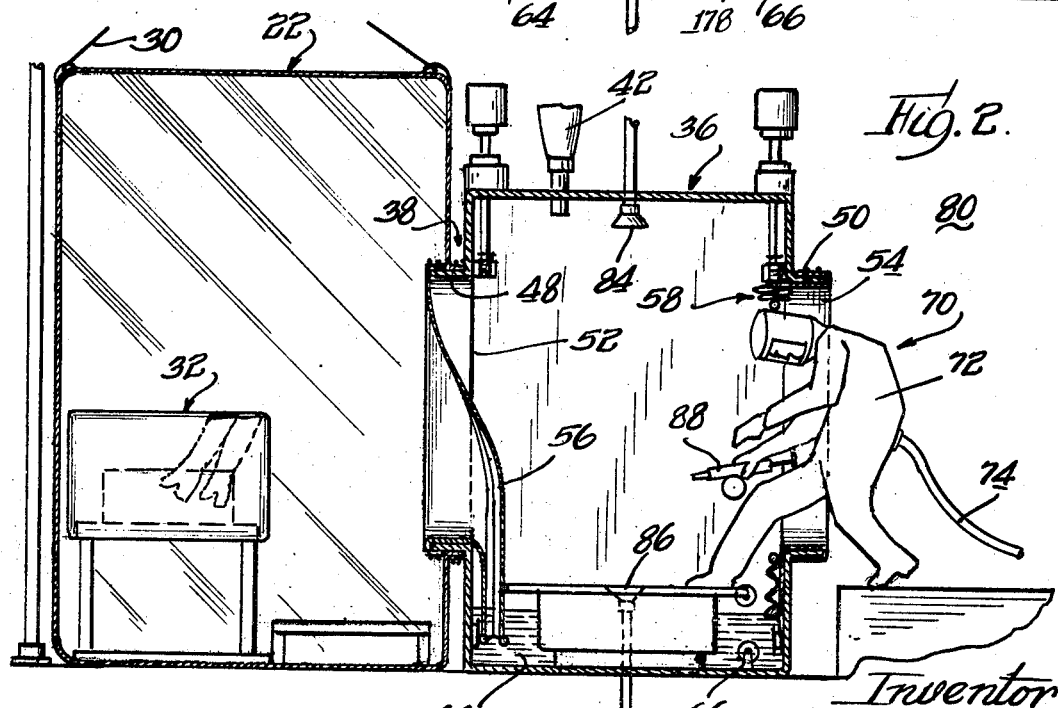

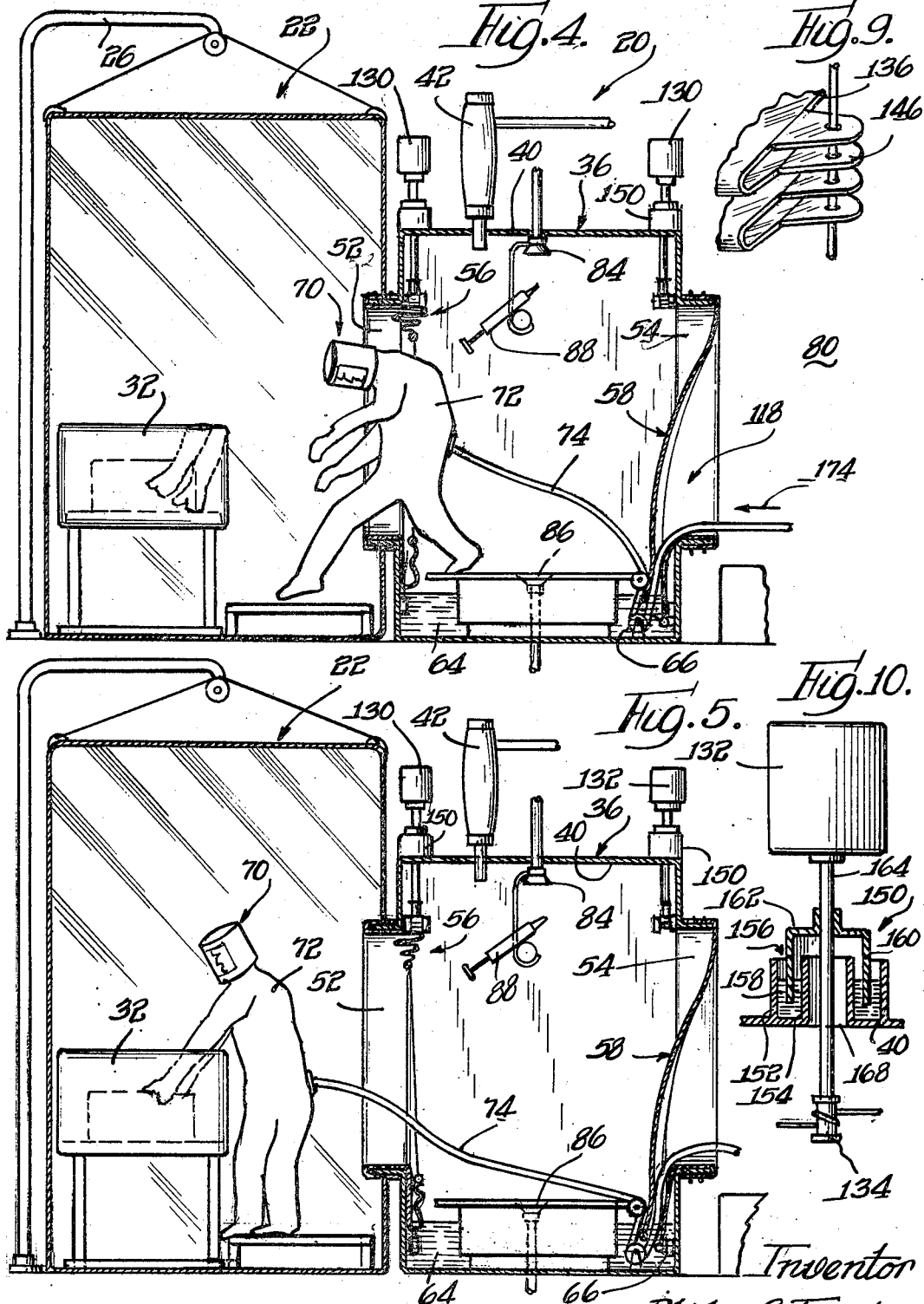

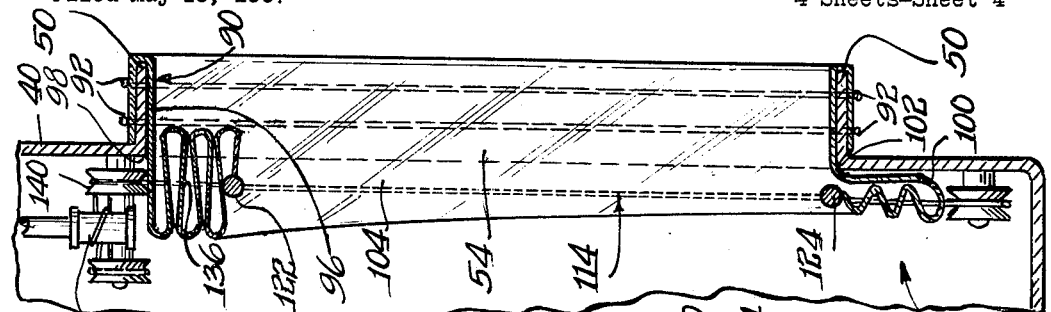
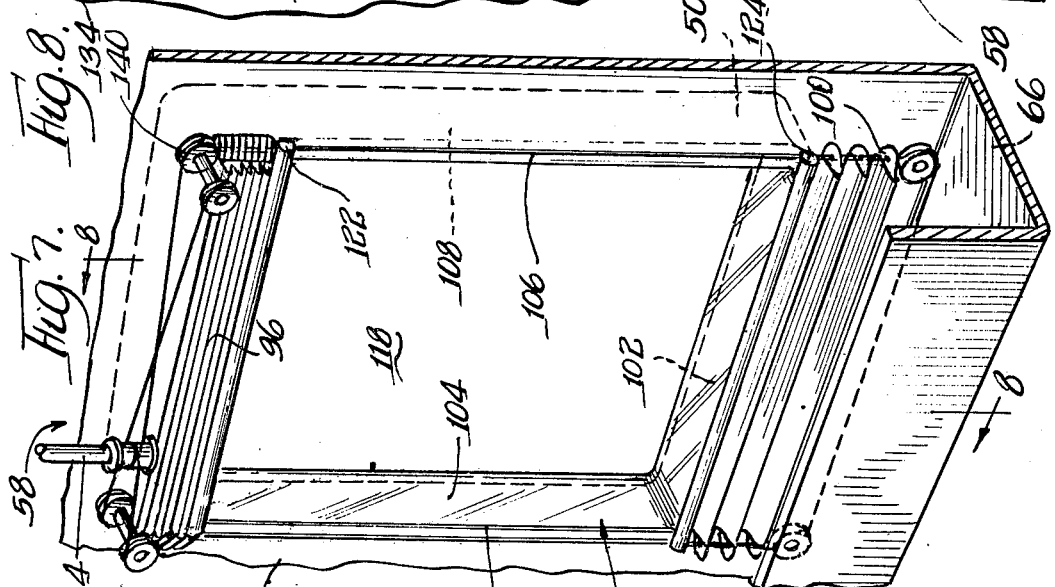
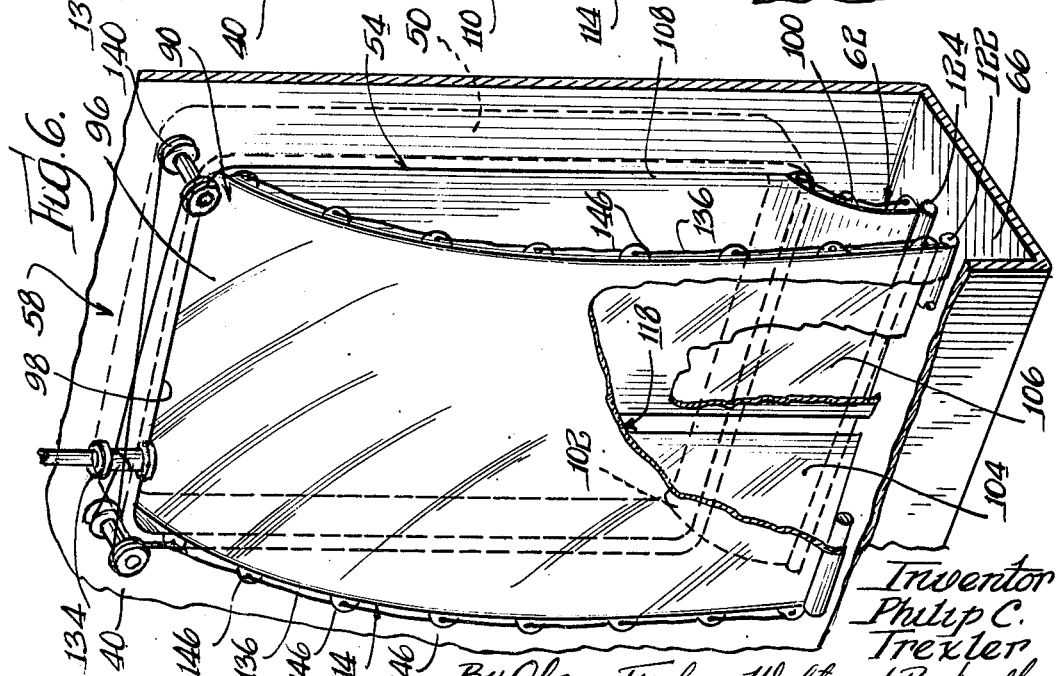

United States Patent Office 3,501,213
Patented Mar. 17, 1970

3,501,213
ISOLATOR ASSEMBLY AND METHOD OF
ENTERING SAME
Philip C. Trexler, Stoneham, Mass., assignor to Snyder
Manufacturing Company, Inc., New Philadelphia, Ohio,
a corporation of Ohio
Filed May 19, 1967, Ser. No. 639,669
Int. Cl. E04h 1/12; E06b 7/28; A61l 1/00
U.S. Cl. 312—1                                    9 Claims

ABSTRACT OF THE DISCLOSURE

A method and means for enabling a person to leave an isolator room while preventing contaminants from entering the area or room, including an isolator structure having a sterile locker or anteroom with a pair of entrances which are sealed by troughs or reservoirs of fluid.

---

In 1895 the first vertebrate was reared in an environment which was free from microbic contamination. Since then studies have been made wherein colonies of animals have been raised in an uncontaminated environment. Most of these studies are conducted in rigid walled chambers or specimen rooms having a carefully controlled environment. Entering and leaving of these specimen rooms must be done with great care to ensure that contaminants do not enter the specimen rooms.

Entry and exit from the controlled environment of specimen rooms is commonly accomplished by means of a sterilizing or decontaminating locker which is connected to the specimen room. The locker usually has a first opening leading to a normal or uncontrolled surrounding environment and a second entrance leading to the controlled environment of the specimen room. These entrances usually include door structures which are sealed to prevent contaminants from entering the specimen room through the locker.

When a person desires to enter the specimen room, he must first put on a protective fluid-tight garment, similar to a diving suit, having a hose connected to a source of air. The person then enters the locker through the first entrance while the second entrance is sealed. A length of air hose sufficient to enable the person to move freely about the specimen room is pulled into the locker. The first entrance is then sealed, and the locker, the protective suit and the air hose are sterilized. After the sterilizing of the locker, the second entrance is opened and the person enters the controlled environment of the specimen room. Upon leaving the specimen room, the above process of entry to and from the locker is reversed.

The first and second locker entrances should provide secure seals which do not allow contaminants to enter the specimen room. At the same time, the entrances should be readily operated to enable a person wearing a cumbersome protective suit with a trailing air hose to enter and leave the specimen room. The paramount necessity of obtaining a secure seal at the locker entrances has resulted in the use in prior art lockers of closure structures or doors which are difficult and time consuming to manipulate. The difficulties in operating prior art locker closures or doors become quite onerous for a person encased in a cumbersome protective garment. This is particularly true since the wearer of the protective garment must be extremely careful not to puncture the garment while operating the closures or doors.

Therefore, it is an object of this invention to provide an improved locker structure for an isolator assembly which overcomes the aforementioned limitations of prior art constructions. Specifically, it is an object of this invention to provide an improved locker closure structure or door which is easily operated and provides a secure seal against the passage of contaminants when the closure structure or door is sealed.

Another object of this invention is to provide a closure or door structure for a locker through which an air hose can be pulled and sterilized when the closure or door is sealed.

Another object of this invention is to provide an inexpensive easily operated closure or door which is positively sealed by a trough or reservoir of fluid positioned adjacent to the closure or door.

Another object of this invention is to provide a locker structure which can be used with a plurality of flexible walled specimen rooms.

These and other objects and features of the invention will become more apparent upon a reading of the following detailed description taken in connection with the accompanying drawings wherein:

FIG. 1 is a sectional view illustrating an isolator assembly including a specimen room connected to a locker or anteroom, the anteroom including a pair of entryways which are shown in a sealed position;

FIG. 2 is a sectional view, similar to FIG. 1, illustrating the isolator assembly with an entrance between the surrounding environment and the anteroom in an open position to enable a person clad in a protective garment to enter the anteroom;

FIG. 3 is an enlarged sectional view of the anteroom of FIG. 1 with the entryways in a closed or sealed position while the protective garment and the anteroom are being sterilized or decontaminated by a germicidal spray or sterilizing medium;

FIG. 4 is a sectional view, similar to FIGS. 1 and 2, illustrating the anteroom with the entryway between the anteroom and the surrounding environment sealed and the entryway between the anteroom and the specimen room open to enable the person to enter the specimen room from the anteroom;

FIG. 5 is a sectional view, similar to FIG. 4, illustrating the person in the specimen room;

FIG. 6 is an enlarged fragmentary perspective view of a closure assembly used in the anteroom entryways of FIGS. 1 through 5, the closure assembly being shown in a sealed or closed position;

FIG. 7 is an enlarged perspective view illustrating the closure assembly of FIG. 6 in an unsealed or open position;

FIG. 8 is an enlarged sectional view, taken along the line 8—8 of FIG. 7, further illustrating the closure assembly of FIG. 6 in the open position;

FIG. 9 is an enlarged perspective view illustrating eyelets or guide tabs and a drive cable which provide an interconnection between the drive assembly and the closure assembly of FIG. 6; and FIG. 10 is an enlarged elevational view of a drive motor used for operating the closure assembly of FIG. 6.

Referring to the drawings in greater detail, an isolator assembly 20 is shown in FIG. 1. The isolator assembly 20 includes a specimen room or chamber 22 having a plurality of flexible walls 24 formed from a film of vinyl material, such as high density polyethylene, polypropylene, tetrafluoroethylene polymer, trifluorochloroethylene polymer, polyethylene terephthalate resin, or other flexible vinyl resin films. The flexible walls 24 are supported by a frame 26 which is connected to the walls 24 by a suitable support structure 30. A specimen chamber or container 32 is advantageously provided within the specimen room for holding specimens which are to be maintained in a controlled environment. The environment in the specimen room 22 is controlled in a known manner by means of an air supply conduit having a filter and an exhaust conduit (not shown).

An anteroom or decontamination locker or chamber 36 is connected to the specimen room 22 by a releasable connector assembly 38. The anteroom 36 has a plurality of rigid metallic walls 40 which support an air outlet assembly 42. The air outlet assembly 42 is connected to a scrubbing tower or filter 44 of known construction having a fan to maintain a slight negative pressure within the anteroom 36. The anteroom 36 also includes a pair of outwardly extending flanges or mounting walls 48 and 50 which define apertures or entryways 52 and 54 in opposite walls 40 of the anteroom 36. Closure assemblies or door structures 56 and 58 are mounted on the flanges 48 and 50 to form a selectively sealable passage for entering and leaving the anteroom 36. The doors 56 and 58 are shown in a closed or sealed position in which inner end portions or sections 60 and 62 are partially immersed in a pair of spaced apart troughs or channels 64 and 66 forming reservoirs of a volatile germicidal or sterilizing fluid such as a peracetic acid or strong chlorine solution. The air outlet or exhaust system 42 and scrubbing tower 44 remove irritating and corrosive fumes which are given off by the reservoirs of volatile germicidal solution.

A person, such as a worker, is illustrated at 70 in FIG. 1. The worker is encased or enclosed in a protective garment 72 having an air hose 74. The protective garment 72 is advantageously constructed in a manner set forth in detail in U.S. Patent No. 2,779,331. The protective garment 72 prevents contaminants from passing outwardly from the body of the worker and, also, prevents contaminants from passing inwardly to the worker.

The worker 70 enters the anteroom 36 through the entryway closure assembly or door structure 58 which is shown in an open position in FIG. 2. It should be noted that the closure assembly 56 is in a closed or sealed position while the closure assembly 58 is open, so that contaminants from the uncontrolled or normal surrounding environment, indicated at 80 in FIG. 2, cannot enter the specimen room 22 through the entryway between the specimen room and the anteroom. Once the worker has entered the anteroom 36, he operates the closure assembly 58 to seal the entryway 54 between the anteroom and the surrounding environment by positioning the end portion 62 of the closure assembly in the reservoir 66 of fluid, as shown in FIG. 3. The anteroom 36, the protective garment 72, and the air hose 74 are then sterilized by germicidal sprays from a pair of spray heads or fixtures 84 and 86. The worker 70 uses a hand spray gun 88, of known construction, to spray a sterilizing or germicidal medium onto any folds or creases in the closure assemblies 56 and 58 to insure neutralization of all contaminants within the anteroom 36.

After the anteroom 36 has been decontaminated, the worker 70 enters the specimen room 22 by opening the closure assembly 56, as illustrated in FIG. 4. While the closure assembly 56 is open, the closure assembly 58 is maintained in the closed position to seal the entryway between the anteroom 36 and the exterior surrounding environment 80. Since the anteroom has been decontaminated, contaminants or foreign bodies are effectively sealed out of the specimen room 22 while the worker 70 is in the specimen room.

Once inside the specimen room 22, the worker 70 can manipulate and otherwise conduct experiments on animals or specimens within the container 32, as shown in FIG. 5. If a second worker is to join the first worker in the specimen room 22, the closure assembly 56 is closed, as shown in FIG. 1, with the first worker's air hose 74 extending into and out of the reservoir 64 through the closure assembly 56. The second worker then opens the closure assembly 58 to seal the entrance between the anteroom and the surrounding environment, and decontaminates the anteroom, as shown in FIG. 3. The second worker then reopens the closure assembly 56 and joins the first worker in the specimen room 22. This relatively free access to the specimen room is made possible by the closure assemblies 56 and 58 which are easy to operate and provide a seal around the air hoses of the workers.

Of course, the two workers leave the specimen room 22 by reversing the procedure previously set forth. Thus, the workers enter the anteroom 36 from the specimen room 22 through the entryway 52, seal the entryway by positioning the closure assembly 56, as shown in FIG. 3, with the inner end portion 60 in the reservoir 64 to seal the entryway against the passage of contaminants into the specimen room. If the specimen room contained organisms which would be harmful or otherwise undesirable in the surrounding environment 80, the anteroom 36 and the protective garments 72 of the workers would be decontaminated or sterilized, as shown in FIG. 3. However, if the specimen room 22 did not contain dangerous or harmful organisms, the decontamination step of FIG. 3 could be eliminated upon leaving the specimen room 22. The workers then leave the anteroom 36 by moving the closure assembly 58 to the open position shown in FIG. 2 and stepping out of the anteroom.

Referring now to FIG. 6, the closure assembly 58 includes an outer portion 90 which extends through the entryway or aperture 54 and around the flange or the mounting wall 50, as shown in FIG. 8, where it is engaged by a plurality of resilient clamping bands 92 of synthetic rubber or other elastomeric material. The bands 92 form a releasable connector assembly to seal the end portion 90 of the closure assembly 58 against the flange 50. The closure assembly 58 is shown in the closed position in FIG. 6 with the inner end portion 62 of the closure assembly positioned within the reservoir 66 where it is blocked or sealed by the liquid in the reservoir. It should be noted that the closure assembly 58 includes an upper or inner panel or section 96 which extends outwardly from an upper, generally horizontally extending edge 98 of the entryway 54. Similarly, a lower or inner panel or section 100 (see FIG. 8) extends outwardly from a lower edge 102 of the entryway 54. The upper and lower panels 96 and 100 are interconnected by a pair of side panels 104 and 106 which are folded and extend downwardly and inwardly in the closed position of FIG. 6. The side panels 104 and 106 are pulled upwardly adjacent to longitudinal side edges 108 and 110 of the entryway 54 when the closure assembly 58 is in the open position of FIG. 7. The panels or sections 96, 100, 104 and 106 form a flexible generally tubular member 114 having a central passage or entryway indicated at 118 in FIG. 7.

As is clearly seen from FIG. 7, the passage 118 is substantially unimpeded when the flexible tubular member 114 is in the open position to enable a worker to move through the passage into the anteroom 36. When the closure assembly 58 is in the closed position of FIG. 6, with the end portion 62 immersed in the reservoir 66, the passage 118 is blocked or sealed by the fluid in the reservoir to prevent contaminants from passing between the surrounding environment 80 and the anteroom 36. A pair of bars or rods 122 and 124 are mounted in the end portion 62 of the closure assembly 56 to hold the end portion 62 in the position shown in FIG. 6.

As is best seen in FIG. 3, the closure assemblies 56 and 58 are substantially identical in construction and method of operation. Both the closure assemblies 56 and 58 are moved from the closed position shown in FIGS. 3 and 6 to the open position shown in FIGS. 7 and 8 by a pair of drive motors 130 and 132 which are supported by an upper wall 40 of the anteroom 36. When the drive motor 132 is energized, a cable drum or spool 134 is rotated to wind up a drive cable 136. The winding up of the cable 136 lifts the bar 122 upwardly from the closed position shown in FIG. 6 to the open position shown in FIG. 8 by pulling the cable through a plurality of pulleys 140. When the direction of rotation of the motor 132 is reversed by a suitable switch means, the bar 122 is returned from the open position of FIG. 8 to the closed position of FIG. 6. In a similar manner, the drive motor 130 rotates a cable drum or spool 142 to move the closure assembly 56 from the closed position to the open position and back again.

As is perhaps best seen in FIGS. 6 and 9, the cable 136 extends through a plurality of eyelets or guide loops 146 to guide the movement of the cable 136 when the closure assemblies 56 and 58 are opened and closed. It has been found to be advantageous to provide control switches both within the anteroom 36 and exteriorly of the anteroom. The two control switch assemblies enable both the worker 70 within the anteroom 36 and assistants outside the anteroom 36 to move the closures 56 and 58 from the closed position to the open position.

Referring now to FIG. 10, the motor 132 is advantageously provided with a seal 150 which includes a pair of spaced apart, substantially parallel annular walls 152 and 154 mounted on the rigid upper wall 40 of the anteroom 36. The annular walls 152 and 154 and the upper wall 40 define a reservoir 156 for sealing fluid 158. An annular outer wall 160 is connected to a base section 162 which is fixedly mounted on a shaft 164 of the motor 132 and is positioned intermediate the annular reservoir walls 152 and 154. Thus, the fluid 158 within the reservoir 156 seals an aperture 168 in the wall 40 through which the motor drive shaft 164 extends. A similar sealing structure 170 is used with the motor 130.

When the worker 70 is within the anteroom 36 and the closure assembly 58 is sealed by placing the inner end portion 62 in the reservoir 66, the air hose 74 extends through the passage 118 which is sealed by the fluid within the reservoir 66 (see FIG. 3). After the worker has decontaminated the anteroom 36, in the manner illustrated in FIG. 3, he enters the specimen room 22, as shown in FIG. 4. In moving from the anteroom 36 to the specimen room 22, additional air hose must be pulled in the direction of the arrow 174 through the passage 118 into the anteroom 36 to provide the necessary length or slack to enable the worker to move between the two rooms. Since the reservoir 66 is filled with a sterilizing or germicidal solution, the additional length of air hose is sterilized as it is pulled into the anteroom 36 by passing into and out of the reservoir 66. As is perhaps best seen in FIG. 3, the air hose is guided in this movement into the anteroom 36 by a plurality of pulleys or sheaves 176 and 178. Thus, since the air hose 74 is sterilized as it is pulled through the passage 118 of the sealed entryway, the pulling of additional hose into the anteroom 36 and the specimen room 22 does not bring contaminants from the surrounding environment into the anteroom and the specimen room.

As was previously mentioned, the specimen room 22 has flexible walls 24 which are connected to an outwardly extending mounting wall 48 by a connector assembly 38 (see FIG. 3). The connector assembly 38 includes a plurality of resilient bands 182 which clamp the flexible wall 24 of the specimen room and the closure assembly 56 against the flange 48. The connector assembly 38 is readily released, by merely moving the bands 182 outwardly away from the flange 48 so that the specimen room 22 can be disconnected from the anteroom 36 and a new specimen room connected to the anteroom. This releasable connection between the anteroom 36 and the specimen room 22 enables the solid, relatively expensive anteroom 36 to be used with a plurality of flexible walled specimen rooms 22. Thus, at the end of one experiment, it is merely necessary to disconnect the specimen room 22 associated with that experiment from the anteroom 36 and connect a new specimen room 22, which can have any desired shape, to the anteroom for the next experiment.

After being attached to the anteroom 36, the new specimen room 22 is sterilized for the next experiment by using a spray gun, similar to the spray gun 88, to neutralize any contaminants which may be within the specimen room 22. The closure assembly 56 is not connected during the disinfecting or decontamination of the specimen room 22, so that surfaces which are concealed by the closure assembly 56 can be sterilized. The sterilized closure assembly 56 is then connected to the mounting wall or flange 48 and the worker steps into the sterilized anteroom 36 and closes the closure assembly 56. The closure assembly 58 is then opened and the worker leaves the anteroom 36. The specimen room 22 and anteroom 36 are now ready to begin the next experiment.

For purposes of affording a more complete understanding of the invention, it is advantageous now to provide a functional description of the mode in which the isolator assembly 20 operates. When an experiment is to be conducted, the specimen room 22 will be connected to the anteroom 36 at the outwardly extending flange 48 by connector bands 182. A worker will enter the anteroom 36, seal the closure assembly 58 and sterilize or decontaminate the anteroom and his protective garment 72. The worker will then proceed to sterilize the specimen room 22. After the specimen room 22 has been thoroughly sterilized, the closure assembly 56 will be connected to the flange 48 and the worker will enter the anteroom 36 and close the closure assembly 56. The closure assembly 56 will be sealed by liquid in the reservoir 64. The closure assembly 58 will then be opened and the worker will leave the anteroom 36.

Experimental specimens in a suitable container 32 will then be brought into the anteroom 36. The closure assembly 58 will be sealed by putting an end portion 62 of the closure assembly into the reservoir 66. The protective garment 72 of the worker and the specimen container 32 will then be thoroughly sterilized by a spray from fixtures 84, 86 and the spray gun 88. The closure assembly 56 will then be opened and the worker will enter the specimen room 22 to position the specimen container 32, as shown in FIG. 5. The worker will then reverse the process to leave the specimen room and the anteroom.

In view of the foregoing remarks, it is apparent that the novel closure assemblies 56 and 58 facilitate movements of the worker 70 between the surrounding environment 80 and the specimen room 22. Each of the closure assemblies 56 and 58 includes a flexible generally tubular member 114 having a central passage 118. A first end portion 90 of the tubular member 114 is sealed to the flange 50. The second end portion 62 of the tubular member 114 is movable relative to the first end portion 90 from an open position in substantial alignment with the first end portion of the tubular member (see FIG. 7) to a closed position wherein the second end portion 62 of the tubular member extends into a reservoir of liquid (see FIG. 6). The passage 118 is then blocked and sealed by the liquid in the reservoir 66, to prevent contaminants from entering the anteroom 36 through the passage 118.

While particular embodiments of the invention have been shown, it should be understood, of course, that the invention is not limited thereto since many modifications may be made; and it is, therefore, contemplated to cover by the appended claims any such modifications as fall within the true spirit and scope of the invention.

What is claimed is:

1. An assembly comprising: a first room having a plurality of walls and a controlled environment; a second room having a plurality of walls; decontamination means supported by at least one wall of said second room for neutralizing contaminants in said second room; a first entryway interconnecting said first and second rooms, said first entryway being sealable to enable a person to pass between said first and second rooms and to seal said first entryway against passage of contaminants between said first and second rooms; a second entryway interconnecting said second room and a surrounding environment to enable a person to pass between the surrounding environment and said second room; and a trough of fluid positioned adjacent to said second entryway, said second entryway including a substantially tubular passage defining member having a first end portion fixedly supported by at least one wall of said second room and a second end portion movable relative to said first end portion, said second end portion being movable from an open position in which a person can move between said second room and the surrounding environment through both said first and second end portions of said passage defining member to a closed position in which the second end portion of said passage defining member is located in said trough of fluid to seal said second entryway against passage of contaminants between the surrounding environment and said second room, said decontamination means being operable when said first and second entryways are sealed to neutralize contaminants in said second room to enable a person to pass from said second room to said first room without transmitting contaminants from the surrounding environment to said first room.

2. An assembly as set forth in claim 1 wherein: the walls of said first room are made of a flexible material and the walls of the second room are made of a rigid material.

3. An assembly as set forth in claim 1 further including: drive means connected to said passage defining member to move said passage defining member from the closed position to the open position.

4. An assembly as set forth in claim 1 wherein: an air hose for a protective garment of a person in said second room extends into said trough of fluid and through the first and second end portions of said passage defining member when said second entryway is sealed, said air hose being movable relative to the trough through the first and second end portions of said passage defining member to enable the person in said second room to increase the length of air hose in said second room while said second entryway is sealed against the passage of contaminants from the surrounding environment.

5. An assembly as set forth in claim 4 further including: a second trough of fluid adjacent to said first entryway, said first entryway including a second substantially tubular passage defining member having a first end portion fixedly supported relative to the walls of said second room and a second end portion movable relative to the first end portion of said second substantially tubular passage defining member, said second end portion of said second substantially tubular passage defining member being movable from an open position in which a person can move between said first and second rooms through both said first and second end portions of said second substantially tubular passage defining member to a closed position in which the second end portion of said second substantially tubular passage defining member is located in said second trough of fluid to seal said first entryway against passage of contaminants between said first and second rooms.

6. An assembly comprising: an anteroom defined by rigid walls; a first entryway interconnecting the anteroom and a surrounding environment, said first entryway being selectively sealable to prevent the passage of contaminants between the surrounding environment and the anteroom; a specimen room defined by a plurality of flexible walls and having a controlled environment; a selectively releasable connector means interconnecting said anteroom and said specimen room; said connector means being releasable to enable the anteroom to be connected to any one of a plurality of specimen rooms; and a second entryway interconnecting the anteroom and the specimen room, said second entryway being selectively sealable to prevent the passage of contaminants between the anteroom and the specimen room.

7. An assembly as set forth in claim 6 further including: decontamination means connected to the anteroom to enable contaminants in the anteroom to be neutralized.

8. An assembly as set forth in claim 6 wherein: said first entryway includes a flexible member at least partially defining a passage between the surrounding environment and the anteroom; and wherein a reservoir of liquid is located adjacent to said first entryway, said flexible member being movable relative to the reservoir of liquid from a first position in which the passage is open to a second position in which the flexible member is at least partially immersed in the reservoir of liquid to seal the passage against contaminants from the surrounding environment.

9. A method of entering a specimen room having a controlled environment from a surrounding environment, said method comprising the steps of: providing an anteroom having first and second entrances; sealing both said entrances by, providing a liquid reservoir within said anteroom adjacent each said entrance, attaching one end of a flexible tubular member to the wall structure surrounding each said entrance, and disposing the free end of said tubular member in the associated liquid reservoir; releasably connecting said anteroom to the specimen room such that one of said entrances is adapted, upon the opening thereof, to communicate with the interior of said specimen room; removing the free end portion of the flexible tubular member associated with the other of said entrances from the fluid reservoir to provide access to said anteroom; entering the anteroom through said other entrance; repositioning the free end portion of the flexible tubular member associated with said other entrance in its respective liquid reservoir to seal said other entrance; decontaminating the anteroom; removing the free end portion of the flexible tubular member associated with said one entrance from its liquid reservoir to provide access from said anteroom to the specimen room; and entering the specimen room through said one entrance.

References Cited

UNITED STATES PATENTS

| 3,050,791 | 8/1962  | Trexler  | 49—477 XR |
| 3,146,500 | 9/1964  | Volkert  | 49—68 XR  |
| 3,339,992 | 9/1967  | Trexler  | 312—3     |
| 3,348,890 | 10/1967 | Trexler  | 312—3     |
| 3,355,230 | 11/1967 | Trexler  | 312—1     |

MORRIS O. WOLK, Primary Examiner

B. S. RICHMAN, Assistant Examiner

U.S. Cl. X.R.

21—61; 23—259; 49—68; 128—1; 312—3

UNITED STATES PATENT OFFICE
CERTIFICATE OF CORRECTION

Patent No. 3,501,213          Dated March 17, 1970

Inventor(s) Philip C. Trexler

It is certified that error appears in the above-identified patent and that said Letters Patent are hereby corrected as shown below:

Column 3, line 70, after "assembly 58" insert the following: -- , enters the anteroom, closes the closure assembly 58--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents